United States Patent
Hashimoto (10) Patent No.: US 11,976,940 B2
(45) Date of Patent: May 7, 2024

(54) VEHICLE DATA COLLECTION SYSTEM AND METHOD OF USING

(71) Applicant: Woven by Toyota, Inc., Tokyo (JP)

(72) Inventor: Daisuke Hashimoto, Chofu (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 120 days.

(21) Appl. No.: 17/489,791

(22) Filed: Sep. 30, 2021

(65) Prior Publication Data

US 2023/0097749 A1    Mar. 30, 2023

(51) Int. Cl.
*G06N 3/02* (2006.01)
*G01C 21/00* (2006.01)

(52) U.S. Cl.
CPC ....... *G01C 21/387* (2020.08); *G01C 21/3807* (2020.08); *G01C 21/3841* (2020.08); *G01C 21/3885* (2020.08); *G06N 3/02* (2013.01)

(58) Field of Classification Search
CPC ............ G01C 21/3807; G01C 21/3841; G01C 21/387; G01C 21/3885; G06N 3/02
See application file for complete search history.

(56) References Cited

U.S. PATENT DOCUMENTS

| | | | | |
|---|---|---|---|---|
| 9,053,431 B1* | 6/2015 | Commons | ............... | G06N 3/02 |
| 2013/0216098 A1* | 8/2013 | Hasegawa | ............... | G06T 7/579 |
| | | | | 901/1 |
| 2019/0090094 A1* | 3/2019 | Chokshi | ............. | G08B 21/0269 |
| 2019/0139403 A1* | 5/2019 | Alam | ................. | G01C 21/3461 |
| 2019/0353500 A1* | 11/2019 | Di Pietro | ........... | G01C 21/3811 |
| 2020/0193552 A1 | 6/2020 | Turkelson et al. | | |
| 2020/0263995 A1* | 8/2020 | Gaal | ...................... | H04W 4/021 |
| 2021/0052206 A1* | 2/2021 | Kale | ...................... | G06V 10/82 |
| 2022/0100855 A1* | 3/2022 | Kumar | ................... | G06F 21/51 |
| 2023/0060270 A1* | 3/2023 | Kim | ......................... | G01S 7/412 |

FOREIGN PATENT DOCUMENTS

| | | | | |
|---|---|---|---|---|
| CN | 112990220 A | * | 6/2021 | ............. G06K 9/344 |
| CN | 113096140 A | * | 7/2021 | ............. G06K 9/38 |
| DE | 102021202778 A1 | * | 9/2022 | |
| JP | 2018529175 A | * | 10/2018 | |
| JP | 201991235 A | | 6/2019 | |
| JP | 2019125369 A | | 7/2019 | |
| JP | 2020030568 A | * | 2/2020 | |
| JP | 202052539 A | | 4/2020 | |
| WO | WO-2021167189 A1 | * | 8/2021 | ............. G06K 9/62 |
| WO | WO-2021224896 A1 | * | 11/2021 | ........... G01S 13/931 |

* cited by examiner

*Primary Examiner* — Redhwan K Mawari
*Assistant Examiner* — Farhad Dawodi
(74) *Attorney, Agent, or Firm* — HAUPTMAN HAM, LLP (57) ABSTRACT

A vehicle data collection system includes a vehicle-mounted sensor; a non-transitory computer readable medium configured to store instructions; and a processor connected to the non-transitory computer readable medium. The processor is configured to execute the instructions for generating an invariant feature map, using a first neural network; and comparing the invariant feature map to template data to determine a similarity between the invariant feature map and the template data, wherein the template data is received from a server. The processor is further configured to execute the instructions for determining whether the determined similarity is exceeds a predetermined threshold; and instructing a transmitter to send the sensor data to the server in response to a determination that the determined similarity exceeds the predetermined threshold.

20 Claims, 5 Drawing Sheets

VEHICLE DATA COLLECTION SYSTEM AND METHOD OF USING

BACKGROUND

Vehicles are equipped with a wide variety of sensors. Sensors include camera, light distance and ranging (LiDAR) sensors and other type of sensors. These sensors are able to collect data from an environment surrounding a vehicle. Portions of the collected data are stored within the vehicle for use by the vehicle or for later retrieval by an external device.

Data collection systems based on information obtained from vehicle sensors are based on trigger conditions. These trigger conditions are pre-defined rule-based conditions. These trigger conditions are stored in a memory within the vehicle and pre-set data is collected from sensors within the vehicle in response to satisfaction of the trigger conditions. Examples of trigger conditions include sudden deceleration, sudden acceleration, rapid turning of a steering wheel, a vehicle entering a certain area, or a vehicle malfunction.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Throughout the description, reference is often made to a vehicle. One of ordinary skill in the art would recognize that the reference to a vehicle is merely for simplicity of description and that the disclosure is not limited to collecting data using a single vehicle. Instead, one of ordinary skill in the art would recognize that this disclosure is applicable to data collection by a single vehicle, a fleet of commonly owned vehicles, groups of privately owned vehicles or other groups of vehicle based on the data which is being sought.

Reliance on pre-defined and rule-based trigger conditions limits an ability to maximize usefulness of data collected by sensors in vehicles. In some situations, a desired trigger condition is difficult to describe using rule-based syntax. In some situations, new criteria for a trigger condition arise. For example, if a criminal is known to be driving a certain type of car, using vehicle sensors of other vehicles to identify locations where that type of car is located would help police to be able to apprehend the criminal. This type of trigger condition, a car type and/or color and/or characteristics of car stains, is not something that would be pre-defined within the vehicle. Therefore, an ability to receive information related to new trigger conditions and provide data related to those new trigger conditions increases usefulness of data collected by vehicle sensors.

Without an ability to update trigger conditions, a risk of false negative or false positive data collection increases. For example, the inability to provide updated trigger conditions or describe the trigger condition in a manner that is difficult using syntax results in a failure of a vehicle or vehicles to report detection of the trigger condition even if the trigger condition actually occurred, i.e., a false negative. Alternatively, if the vehicle or vehicles provide a large amount of data due to overly broad trigger conditions, truly relevant data has a higher risk of being buried within the large amount of data. As a result, the truly relevant data has a risk of being overlooked and not considered, i.e., a false positive.

In order to reduce false positives and false negatives, neural networks are usable to develop invariant feature maps based on data provided by a user. The invariant feature map is then transferred to the vehicle or vehicles and is used to develop a template for comparison with data collected by the vehicle sensors. The vehicle or vehicles identify data which has a high similarity with the received invariant feature map and transmits that data to a server. The server then collects the data and provides the data to the user. By using the invariant feature map as a basis for comparison, reliance on syntax based trigger conditions is reduced. Further, data related to new trigger conditions is collectible. In addition, the data comparison is more precise leading to less false positives and/or false negatives which would reduce the usefulness of the collected data. This system is also able to reduce an amount of data transmitted from the vehicle to the server in some instances which reduces processing load at both the vehicle and the server as well as power used to transmit the data. This reduction is processing load and transmission power consumption at the vehicle helps to improve fuel consumption by an internal combustion vehicle and/or reduces battery charge consumption in a hybrid or electric vehicle.

Figure 1:
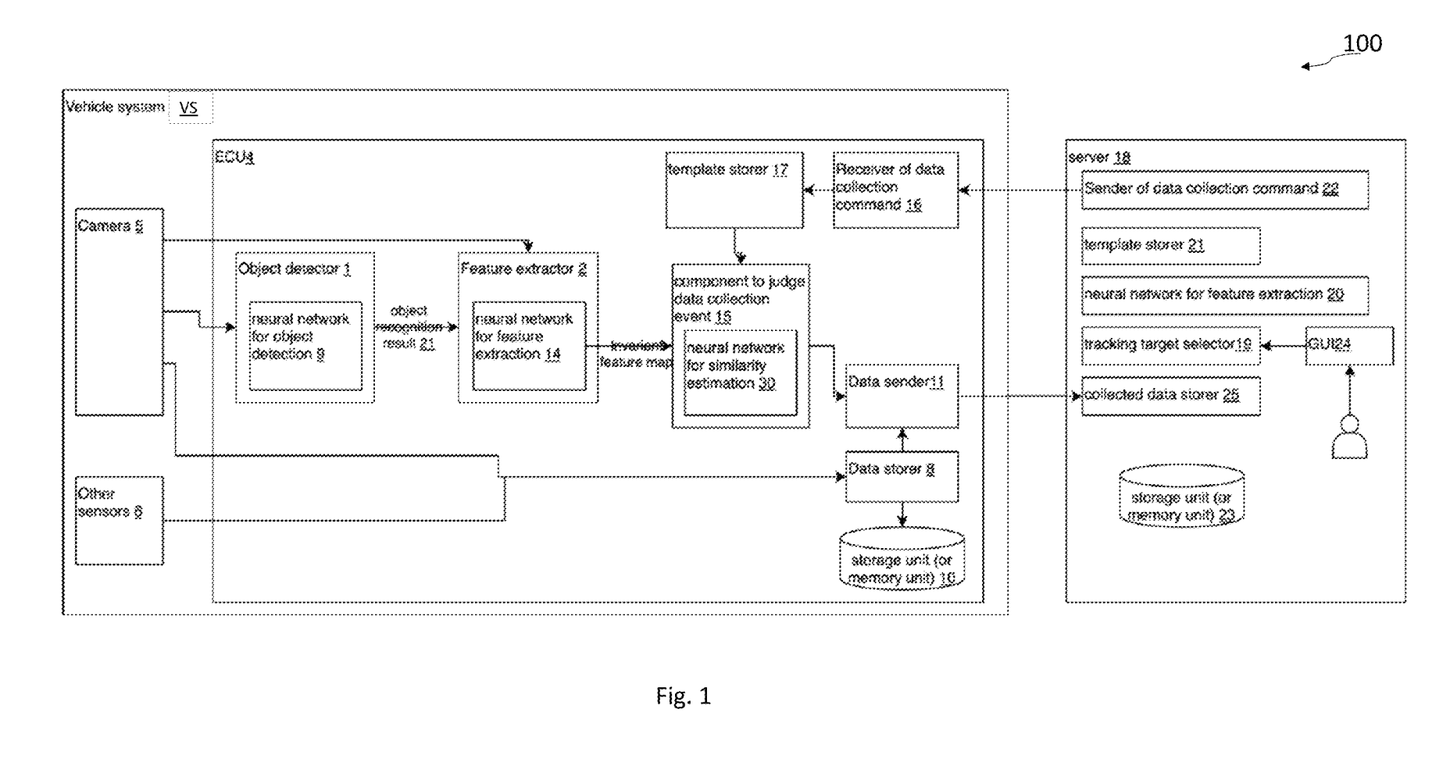
FIG. 1 is a schematic diagram of a vehicle data collection system in accordance with some embodiments.

FIG. 1 is a schematic diagram of a vehicle data collection system 100 in accordance with some embodiments. The vehicle data collection system 100 includes a vehicle system VS and a server 18. The vehicle system VS is configured to communicate with the server 18. In some embodiments, the communication is wireless communication. In some embodiments, the communication is wired communication. The vehicle system VS is incorporated into a vehicle. In some embodiments, the vehicle is an automobile, such as an autonomous driving automobile, a motorcycle, a golf cart or another suitable vehicle. The server 18 is configured to send data collection commands to the vehicle system VS. The vehicle system VS receives the data collection commands and sends data back to the server 18 based on the received data collection commands.

The data collection command includes information related to an object or occurrence for which data is requested. In some embodiments, the data collection command further includes information related to a time period prior to and after the detection of the object or occurrence for which collected data is requested. In some embodiments, the data collection command further includes information related to the type of collected data requested, e.g., image data, location data, proximity data, etc. Proximity data is information indicating how close a detected object is to the vehicle. In some embodiments, the data collection command further includes priority information for raising or lower a priority for responding to the data collection command.

The vehicle system VS includes a camera 5 and other sensors 6 configured to capture data of an environment surrounding the vehicle. The vehicle system further includes an electronic control unit (ECU) 4. The ECU 4 is configured to receive captured images from the camera 5 and other collected data from the other sensors 6. The ECU 4 is configured to process the captured images and other collected data, collectively referred to as collected data. In some embodiments, the camera 5 includes a visible light camera. In some embodiments, the camera 5 includes an infrared (IR) camera. In some embodiments, the camera 5 includes a combination of visible light and IR cameras. In some embodiments, the camera 5 includes a depth sensing camera. In some embodiments, the other sensors 6 include a light detection and ranging (LiDAR) sensor, a radio wave sensor, a radio detection and ranging (RADAR) sensor, a sonar sensor, a GPS sensor, a speed sensor, a microphone, a fuel sensor, an oxygen sensor, a tire pressure sensor, a thermometer, other suitable sensors or combinations thereof. In some embodiments, the collected data includes image data, point cloud data, or other suitable data. The ECU 4 processes the collected data in order to determine what, if any, data to provide to the server 18 in response to the data collection command.

The ECU 4 is configured to implement various modules for processing the collected data. The ECU 4 includes an object detector 1 for detecting a type and position of objects based on the collected data. The object detector 1 includes a neural network (NN) for object detection 9. The NN for object detection 9 is a trained NN for recognizing the sensor data to determine the presence of objects within the sensor data. The NN for object detection 9 is configured to classify the object to determine what type of object is detected, e.g., an automobile, a bicycle, a pedestrian, a building, traffic sign, etc. The object detector 1 outputs an object detection result 21 indicating the type and position of each detected object.

The ECU 4 further includes a feature extractor 2 configured to generate an invariant feature map for each of the detected objects based on the object recognition result 21 and information from the camera 5. An invariant feature map is a map of data for an image or a portion of an image usable to identify a specific object. The invariant feature map includes an abstract information where the feature information that is related to the objects and/or the scene in the image is abstracted and the information which is not related to the objects and/or the scenes but is only related to hardware (HW) configurations and characteristics of the vehicle system VS is removed. Noise data is also reduced in the invariant feature map. That is, the distinguishing features of an object are quantified and identified based on the image as abstract information, so that a NN is able to recognize the object from another image regardless of the HWs which captured the image. In some embodiments, the feature extractor 2 also receives information from the other sensors 6. The feature extractor 2 includes a NN for feature extraction 14. The NN for feature extraction 14 is a trained NN for extracting features within the detected objects from the image data and the object recognition result 21 that are usable to identify a specific object. In some embodiments, the NN for feature extraction 14 is generic as to the vehicle including the ECU 4. In some embodiments, the NN for feature extraction 14 is tune to a specific vehicle including the ECU 4. For example, in some embodiments, the NN for feature extraction 14 is configured to use historical data related to previously processed collected data to assist in determining the invariant feature map. The feature extractor 4 is configured to output the invariant feature map. In some embodiment, the feature extractor 2 generates an invariant feature map from the data from camera 5 without using the object recognition result 21. In some embodiment, the feature extractor 2 generates invariant feature map from the data from other sensors 6 such as LiDAR without using camera data. For example, the feature extractor 2 generates the invariant feature map from the point cloud data from LiDAR sensor.

The ECU 4 further includes a component to judge data collection event (data collection event judge) 15. The data collection event judge 15 is configured to determine a similarity between the invariant feature map from the feature extractor 2 and template data from a template storer 17. The data collection event judge 15 includes a NN for similarity estimation 30. The NN for similarity estimation 30 is a trained NN for comparing the invariant feature map with the template data and determining how similar the two items are to each other. In some embodiments, the NN for similarity estimation 30 is trained using triplet loss as a loss function. In some embodiments, the NN for similarity estimation 30 has a SiameseNet™ structure. In some embodiments where the data collection command includes information related to weights all the nodes of the NN 30 used to generate a target invariant feature map, the NN for similarity estimation 30 is configured to use the weights in determining similarities between the invariant feature map based on the camera 5 and sensors 6 and a target in the template storer 17.

The data collection event judge 15 outputs a similarity between the invariant feature map and the template data. In response to a determination that the similarity between the invariant feature map and the template data exceeding a predetermined threshold, the data collection event judge 15 determines that the collected data should be transmitted to the server 18. The data collection event judge 15 identifies the collected data that should be transmitted to the server 18 and sends instructions to a data storer 8 to write the collected data to be transmitted to the storage unit 10. In response to a determination that the similarity between the invariant feature map and the template data is at or below the predetermined threshold, the data collection event judge 15 determines that the collected data should not be transmitted to the server 18 and no supplemental instruction is transmitted to the storage unit 10 for preventing overwriting of the collected data. In some embodiments, the protocol associated with transmitted data includes storing the collected data until the collected data is transmitted. In some embodiments, the protocol associated with transmitted data includes storing the collected data until confirmation of receipt of the collection data from the server 18 is received. In some embodiments, the protocol associated with the collected data includes storing the collected data until an instruction to delete the collected data is received. In some embodiments, the normal protocol includes storing the collected data until available storage space in the storage unit 10 is below a storage threshold. In some embodiments, the normal protocol includes storing the collected data for a predetermined length of time.

In some embodiments, the data collection event judge 15 is configured to determine whether the collected data contains private information, such as privacy information, or personal information (PI). In some embodiments, private information includes a face of a person, identifying information of a person, or other sensitive data. In response to a determination that the collected data contains private information, the data collection event judge 15 is configured to filter out or remove the private information, in some embodiments. In some embodiments, the data collection command includes authentication or override information to permit transmission of private information. For example, in response to a data collection command from police to look for a certain individual, collected data including a face of a person deemed to have similarity above the threshold value to the individual sought is able to be transmitted. In some embodiments, an ability to override the filtering of private information is limited to a specific class of users to reduce the risk of inadvertently providing private information to a user that should not be permitted to receive private information. In some embodiments, the specific class of users include law enforcement or other suitably qualified users. In some embodiments, the specific class of users is adjustable. In some embodiments, the data collection event judge 15 further includes a second NN for filtering out the private information. In some embodiments, the private information is filtered out using the NN for similarity estimation 30. In some embodiments, NN 30 is trained so that NN 30 implicitly filter out private information without the data collection event judge 15 determine whether the collected data contains private information by rule-based algorithm.

The ECU 4 further includes a receiver of data collection command (receiver) 16. The receiver 16 is configured to receive the data collection command and the template data from the server 18. In some embodiments, the receiver 16 is a transceiver capable of both receiving and transmitting data. In some embodiments, the receiver 16 is configured to receive the data collection command and template data wirelessly. In some embodiments, the receiver 16 is configured to receive the data collection command and template data via a wired connection. In some embodiments, the receiver 16 is configured to perform authentication for the received data collection command and/or template data before storing the data in the ECU 4. In some embodiments, the receiver 16 is configured to receive weight data which should overwrite the existing weight data that is used by the neural network for similarity estimation 30 in the VS. The receiver 16 is configured to transfer the weight information to the NN for similarity estimation 30 so that the NN 30 use the weight data when it infers the similarity. In some embodiments, the receiver 16 is configured to receive weight data which was used to generate the template data and which should overwrite the existing weight data that is used by the neural network for similarity estimation 30 in the VS. The receiver 16 is configured to transfer the template data to a template storer 17. In some embodiments, the receiver 16 is configured to transfer the data collection command to a storage unit 10.

The ECU 4 further includes a template storer 17 configured to store the template data received from the receiver 16. The template storer 17 is configured to provide the template data to the data collection event judge 15 for comparison with the invariant feature map. In some embodiments, the template storer 17 is configured to store multiple templates. In some embodiments, the template storer 17 includes a solid-state memory or another type of memory device. In some embodiments, the template storer 17 is integrated with the storage unit 10. In some embodiments, the template storer 17 is configured to store templates until an instruction to remove the stored template is received. In some embodiments, the template storer 17 is configured to delete stored templates after a predetermined time period has elapsed from initial storing of the template. In some embodiments, individual templates within the template storer 17 have different protocols for deletion of each template. In some embodiments, the storage protocol for at least one template in the template storer 17 is based on information received in the data collection command. In some embodiments, the storage protocol for at least one template in the template storer 17 is based on instructions from a user of the vehicle. In some embodiments, the template includes a target invariant feature map received from the server 18.

The ECU 4 further includes a data sender (transmitter) 11. The transmitter 11 is configured to transmit the collected data based on the data collection command in response to instructions from the data collection event judge 15. In some embodiments, the transmitter 11 considers priority information of the data collection command in determining a timing for transmitting the collected data. In some embodiments, the transmitter 11 sends collected data over a time period prior to and after detection of an object or occurrence satisfying the data collection command based on a requested time period in the data collection command. In some embodiments, the transmitter 11 determines what type of data to transmit based on the data collection command. In some embodiments, the transmitter 11 transmits the invariant feature map. While the above description includes the transmitter 11 determining when and what information to transmit, in some embodiments, the determination of when and what information to transmit in response to the data collection command is performed by another component of the ECU 4, such as the data collection event judge 15. In some embodiments, the transmitter 11 is integrated with the receiver 16 as part of a transceiver. In some embodiments, the transmitter 11 is configured to transmit the collected data wirelessly. In some embodiments, the transmitter 11 is configured to transmit the collected data via a wired connection.

The ECU 8 further includes a data storer 8 configured to store the collected data from the camera 5 and the other sensors 6. In some embodiments, the data storer 8 has a ring buffer structure. In some embodiments, the data storer 8 includes solid state memory or another suitable memory device. In some embodiments, the data storer 8 is configured to provide temporary storage for collected data currently being processed by the ECU 4. In some embodiments, the data storer 8 is configured to transfer data to the storage unit 10 in response to a determination by the data collection event judge 15 to transmit the collected data to the sever 18. In some embodiments, the data storer 8 is configured to delete the collected data in response to a determination by the data collection event judge 15 not to transmit the collected data to the server 18. In some embodiments, the data storer 8 is integrated with the storage unit 10. In some embodiments, the data storer 8 is integrated with the template storer 17.

The ECU 4 further includes the storage unit 10. The storage unit 10 is configured to store the collected data based on instructions from the data collection event judge 15. In some embodiments, the storage unit 10 is integrated with at least one of the data storer 8 or the template storer 17. In some embodiments, the storage unit 10 including solid state memory or another suitable memory. In some embodiments, the storage unit 10 is configured to store information related to fulfillment of data collection commands. In some embodiments, the storage unit 10 is configured to store the collected data in association with a corresponding data collection command. In some embodiments, the storage unit 10 is configured to store collected data that was not deemed to be appropriate for transmission until the collected data is retrieved by a user.

The server 18 includes a graphical user interface (GUI) 24 configured to receive input from a user regarding what target is being sought. In some embodiments, the GUI 24 includes a library to common targets, such as wildlife, weather events, tourist attractions or other suitable targets. In some embodiments, the user is able to upload an image or a partial image to the GUI 24. In some embodiments, the GUI 24 includes restricted sections that are only accessible by the user being authenticated as one of the selected group of users. In some embodiments, the GUI 24 is configured to receive information related to a time period before and after the target is detected to include in the collected data. In some embodiments, the GUI 24 is configured to receive information related to a priority request by the user for receiving the collected data. In some embodiments, the GUI 24 is configured to receive information related to a time of day, weather conditions or other information related to an image uploaded using the GUI 24.

The server 18 further includes a tracking target selector 19 configured to receive the target information from the GUI 24. The tracking target selector 19 determines for which requested target from the GUI 24 to issue a data collection command. In some embodiments, the tracking target selector 19 identifies a next requested target to be the subject of a data collection command based on an entered priority of the requested target at the GUI 24. In some embodiments, the tracking target selector 19 identifies a next requested target to be the subject of a data collection command based on an identity of the user who entered the target into the GUI 24. In some embodiments, the tracking target selector 19 determines a next requested target to be the subject of a data collection command based on a queue (first-in-first-out) or stack (first-in-last-out) process. In some embodiments, a combination of criteria are utilized by the tracking target selector 19 to determine which requested target will be the subject of a data collection command. In some embodiments, the tracking target selector 19 automatically identifies a next requested target to be the subject of a data collection command based on the data at collected data storer 25 and/or the history of the prior tracking target selection without a request from a user via GUI 24.

The server 18 further includes a NN for feature extraction 20 for generating a target invariant feature map corresponding to the requested target received from the GUI 24. The NN for feature extraction 20 is configured to generate a feature map that is independent, or have lower sensitivity, of hardware of sensors within the vehicle that will receive the data collection command. By generating the target invariant feature map independent from the hardware of sensors in the vehicle, the NN for feature extraction 20 is able to produce the target invariant feature map that is useable for a wide range of vehicles including different types of sensors that have varying degrees of resolution and data types. In some embodiments, the NN for feature extraction 20 is configured to utilize information such as time of day, weather condition or other information related to an image uploaded using the GUI 24 in order to generate the target invariant feature map. Using the additional information to generate the target invariant feature map helps to remove variables within the image to generate an invariant feature map that most closely matches the target entered using the GUI 24. In some embodiments, the NN for feature extraction 20 is configured to omit private information from the target invariant feature map.

The server 18 further includes a template storer 21 configured to store the target invariant feature map generated by the NN for feature extraction 20. In some embodiments, the template storer 21 is configured to store the target invariant feature map along with the weights of parameters utilizes in the NN for feature extraction 20 or NN for similarity estimation 30 used to generate the target invariant feature map. In some embodiments, the template storer 21 includes solid state memory or another suitable memory structure. In some embodiments, the template storer 21 is integrated with the storage unit 23. In some embodiments, the template storer 21 is separate from the storage unit 23.

The server 18 further includes a sender of data collection command (data collection command transmitter) 22. The data collection command transmitter 22 is configured to transmit a data collection command to a vehicle including the ECU 4. In some embodiments, the data collection command is transmitted wirelessly. In some embodiments, the data collection command is transmitted via a wired connection. In some embodiments, the data collection command is transmitted to a single vehicle. In some embodiments, the data collection command is transmitted to multiple vehicles. In some embodiments, the data collection command is transmitted to vehicles within a geographic location where the target is expected to be found. The data collection command includes information for the target based on the information received at the GUI 24. In some embodiments, the data collection command includes the target invariant feature map. In some embodiments, the data collection command includes weights of the NN for feature extraction 20 or NN for similarity estimation 30 used to generate the target invariant feature map. In some embodiments, the data collection command transmitter 22 is configured to transmit the data collection command over multiple frequencies. In some embodiments, the data collection command transmitter 22 is configured to transmit the data collection command over a single frequency.

The server 18 further includes a storage unit 23 configured to store information from the GUI 24 as well as information from the tracking target selector 19 and input values, such as weights, for the NN for feature extraction 20. In some embodiments, the storage unit 23 is configured to store an entire image uploaded using the GUI 24. In some embodiments, the storage unit 23 is configured to store a partial image or a cut-out portion of an image uploaded using the GUI 24. In some embodiments, the storage unit 23 is configured to store collected data received from the ECU 4. In some embodiments, the storage unit 23 is configured to store the collected data for a predetermined time period. In some embodiments, the storage unit 23 is configured to store the collected data until a user retrieves the collected data. In some embodiments, the storage unit 23 is configured to store the collected data until additional storage space within the storage unit 23 is below a threshold storage value. In some embodiments, the storage unit 23 include a solid state memory or another suitable memory structure.

The server 18 further includes a collected data storer 25 configured to receive the collected data from the ECU 4. The collected data storer 25 is accessible by the user to permit the user to retrieve the collected data. In some embodiments, the collected data storer 25 is configured to store the collected data along with time and location information associated with when the collected data was detected. In some embodiments, the collected data storer 25 is configured to store the collected data in association with a corresponding data collection command. In some embodiments, the collected data storer 25 is configured to trigger a signal to notify a user of receipt of collected data in response to receiving the collected data based on a data collection command associated with information that the user entered into the GUI 24. In some embodiments, the notification to the user includes an alert to the user. In some embodiments, the alert is sent to a mobile device of a user using a transmitter within the server 18. In some embodiments, a signal is sent to an external transmitter to alert the user. In some embodiments, the alert includes an audio alert or a visual alert. In some embodiments, the collected data storer 25 transfers the collected data to the storage unit 23 for longer term storage. In some embodiments, the collected data storer 25 includes a solid state memory or another suitable memory structure. In some embodiments, the collected data storer 25 is integrated with the storage unit 23 and the template storer 21. In some embodiments, the collected data storer 25 is separate from at least one of the storage unit 23 or the template storer 21. In some embodiments, the collected data storer 25 has a database such as relational database, NoSQL database and Key-Value store (KVS) database so that the user and the tracking target selector 19 are able to search and select data with a query condition.

By using the vehicle data collection system 100, a user is able to provide a specific target to search for using only a GUI 24 without writing search code usable by the ECU 4 and the server 18. The use of invariant feature maps as a tool for defining the target and for defining the collected data, the ECU 4 is able to perform precise similarity analysis for uniquely requested targets. That is, comparison of the invariant feature map based on the camera 5 and other sensor 6 data with the target invariant feature map reduces a risk of false positive and/or false negative results. Further, the NN for feature extraction 20 being agnostic to the types of sensors within different vehicles that are capable of receiving the data collection command from the server 18 helps to increase the opportunities to find the requested target while minimizing an amount of effort for drafting programs or coding associated with the requested target. Further, the NN for feature extraction 20 being agnostic to the types of sensors in the same vehicle helps to share the same template data to search the same target from the data from the different sensors, such as front camera and rear view camera, in the vehicle system VS so that even if the server 18 has only the template data that is generated from front camera, the target is also searchable from the data from rear camera, for example. The vehicle data collection system 100 is also able to reduce the transmission of private or personal information in order to reduce or avoid invasions of privacy during the collection of data associated with a data collection command.

Figure 2:
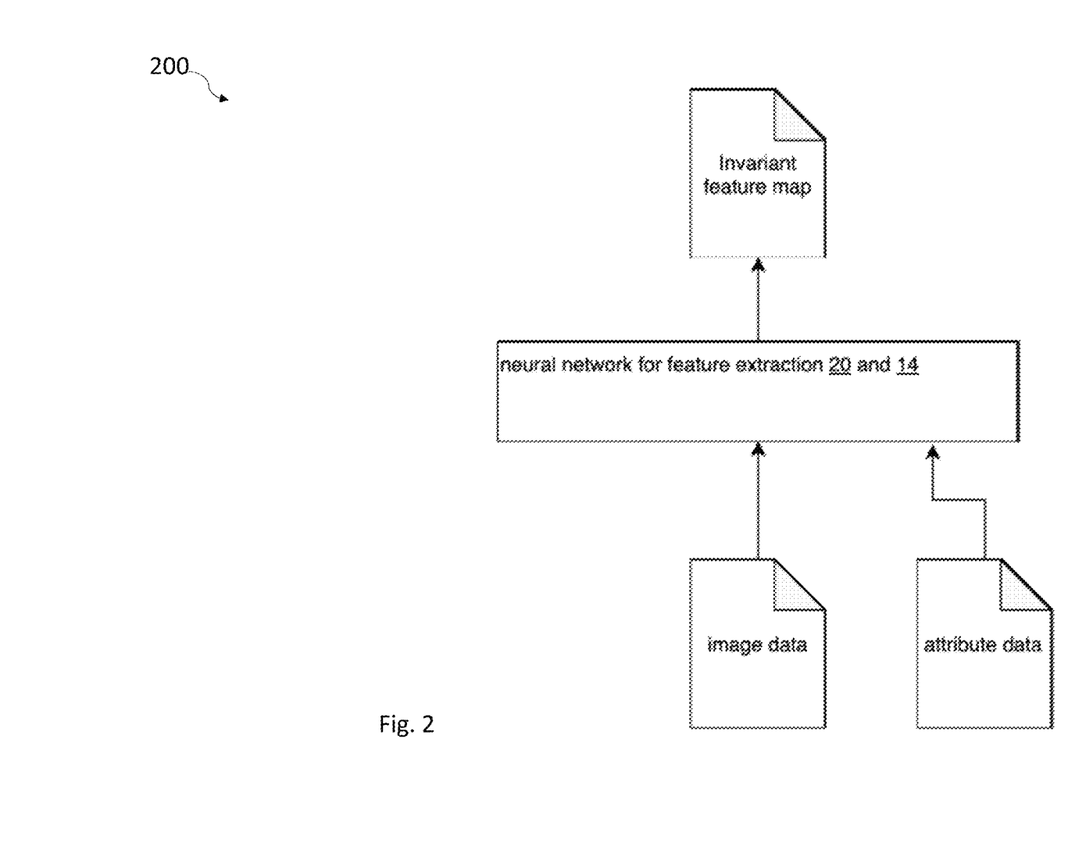
FIG. 2 is a flowchart of a method of generating an invariant feature map in accordance with some embodiments.

FIG. 2 is a flowchart of a method 200 of generating an invariant feature map in accordance with some embodiments. The method 200 is usable in the vehicle data collection system 100 (FIG. 1) for generating invariant feature maps and target invariant feature maps. In the method 200, the invariant feature map is generated from image data, e.g., from camera 5 or other sensors 6 (FIG. 1) or received by the GUI 24 (FIG. 1). In some embodiments, the NN for feature extraction 20 and the NN for feature extraction 14 also use attribute data that is received by a NN from other sensors 6 or the memory area to store attribute parameters 900 in memory unit 10 so that the information which is dependent or has higher sensitivity, of hardware of sensors can be suppressed more. The attribute data captures characteristics of a target. For example, color or size is usable as attribute data to help define characteristics of a target. The attribute data captures characteristics of a scenes when the image was sensed. For example, time, date, weather, temperature, humidity or location of the vehicle is usable as attribute data to help define characteristics of the scene so that the noise which is unrelated to the feature invariant map and is derived from the scene can be reduced by the NN for feature extraction 20 and the NN for feature extraction 14. The NN is a trained NN for extracting the features of one or more objects or scenes in the image data based on the received attribute data. The NN is then able to produce an invariant feature map for comparison between a detected object and a target.

The NN is an NN for feature extraction, e.g., NN for feature extraction 14 or NN for feature extraction 20 (FIG. 1). In some embodiments, the NN for feature extraction 14 and the NN for feature extraction 20 implement are implemented using a same algorithm and weight data in order to increase similarities in the generated invariant feature maps when the detected object matches the target. By using the same algorithm and weight data, there are cases that false positives and/or false negatives are reduced in comparison with other approaches that use different algorithms or weight data. In some embodiments, the NN for feature extraction 14 and the NN for feature extraction 20 are implemented using a same algorithm and different weight data in order to increase similarities in the generated invariant feature maps when the detected object matches the target. In this case, the weight data in vehicle is optimized to the HWs in the specific vehicle system VS so that the information which is dependent or has higher sensitivity to the HW in the VS are suppressed further. In some embodiments, the NN for feature extraction 14 and the NN for feature extraction 20 are implemented using different algorithms and weight data in order to increase similarities in the generated invariant feature maps when the detected object matches the target. In this case, the algorithm in vehicle is optimized to the HWs in the specific vehicle system VS so that the information which is dependent or has higher sensitivity to the HW in the vehicle system VS are suppressed further.

Figure 3:
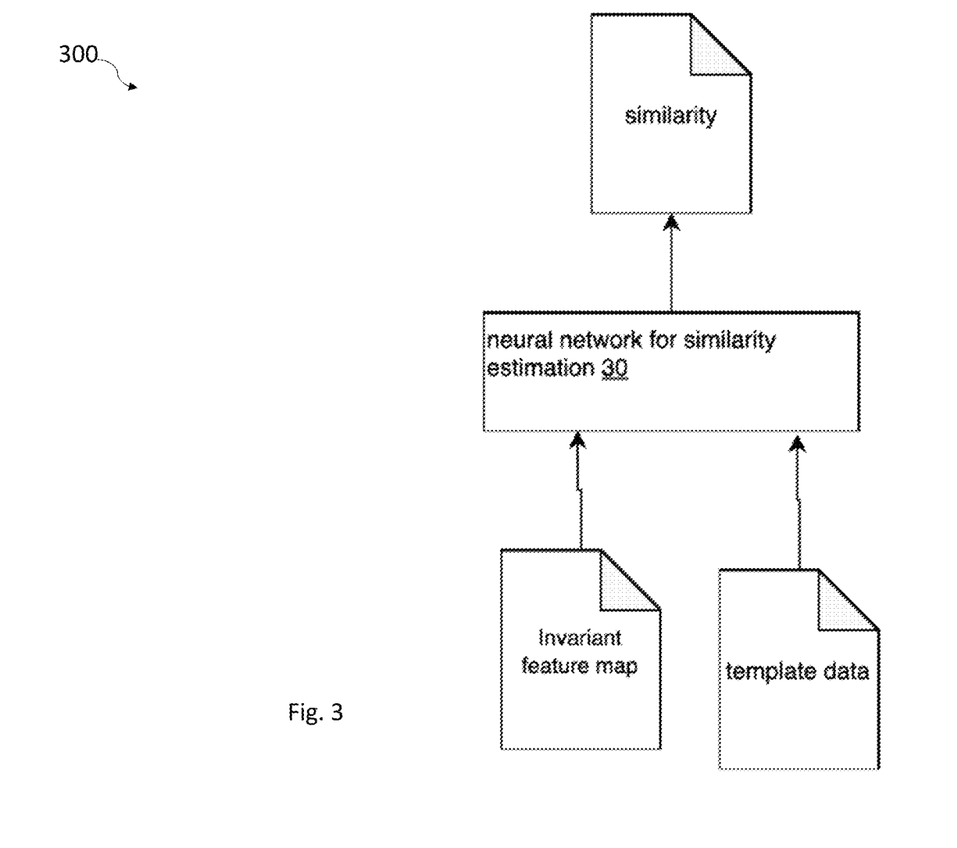
FIG. 3 is a flowchart of a method of determining similarity in accordance with some embodiments.

FIG. 3 is a flowchart of a method 300 of determining similarity in accordance with some embodiments. The method 300 is usable in the vehicle data collection system 100 (FIG. 1) for determining similarities between a detected object and a target. In the method 300, an invariant feature map, e.g., from NN for feature extraction 14 (FIG. 1), and template data, e.g., from the template storer 17 (FIG. 1) are received by a NN. In some embodiments, the template data corresponds to a target invariant feature map, e.g., generated by the NN for feature extraction 20 (FIG. 1). The NN is a trained NN for comparing the template data and the invariant feature map to determine how similar the invariant feature map is to the template data.

The NN is an NN for similarity estimation, e.g., NN for similarity estimation 30 (FIG. 1). By using the NN for similarity estimation, the similarity estimation has lower false negatives and lower false positives than using rule-based algorithm for similarity estimation. By using the NN for similarity estimation, an amount of data transmitted to a server, e.g., the server 18 (FIG. 1), is reduced in comparison with approaches that do not include an NN for similarity estimation because collected data that has low similarity is not transmitted to the server. The reduction in data transmission helps to reduce processing power in a vehicle including the NN for similarity estimation. Further, in a hybrid or electric vehicle, reduction of data transmission helps to prolong charge within the battery of the vehicle, which in turn provides a greater travel distance for the vehicle.

Figure 4:
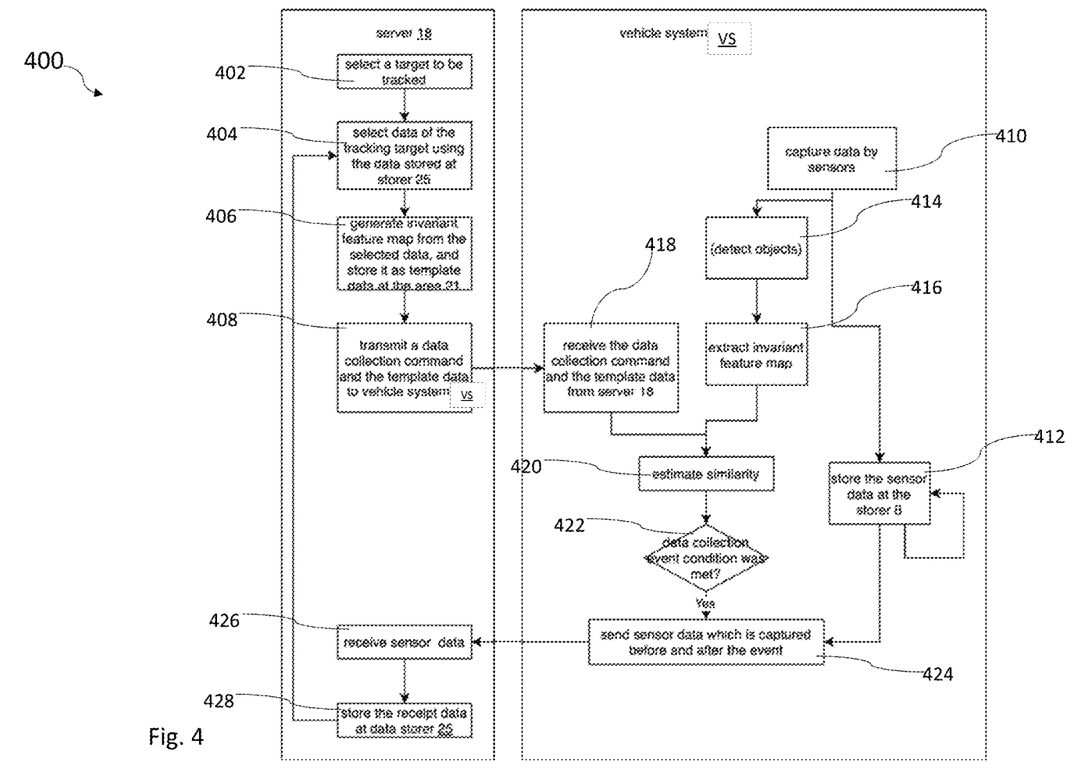
FIG. 4 is a flowchart of a method of using a vehicle data collection system in accordance with some embodiments.

FIG. 4 is a flowchart of a method 400 of using a vehicle data collection system in accordance with some embodiments. The method 400 is able to be implemented by the vehicle data collection system 100 (FIG. 1) and elements used for implementing various steps of the method 400 have the reference number associated with the vehicle data collection system 100. These reference numbers are merely provided for ease of understanding the method 400. One of ordinary skill in the art would recognize that the method 400 is not limited to implementation only on the vehicle data collection system 100 (FIG. 1).

In operation 402, a target is selected to be tracked. In some embodiments, the target is selected based on input from a user, e.g., into GUI 24 (FIG. 1). In some embodiments, the target is determined based on an uploaded image. In some embodiments, the target is selected from a predetermined list of target options available in a GUI, e.g., GUI 24 (FIG. 1). When user upload image data of the target via GUI 24, the GUI stores the image data via storer 25. In some embodiments, the target is automatically determined by tracking target selector 19 without requests from users via GUI 24.

In operation 404, the target is compared against collected data that is already stored in a collected data storer, e.g., collected data storer 25 (FIG. 1). Before the operation 404, data was already collected by the data collection method discussed above or by any other method to collect data. In some embodiments, based on the information provided by users via GUI 24, the image data that is corresponding to the target is selected. For example, if the user provided information such as time, weather, object class, scene and etc., the data is selected by query search via the database in the storer 25. In some embodiments, tracking target selector 19 further has another NN that classifies whether the image data matches the conditions that the user provided via GUI 24 or not, and tracking target selector 19 only select data which is determined by the NN that the image data matches the conditions. In some embodiments, tracking target selector 19 has a target data predictor unit that predicts the target data that may be selected by the users in the future based on the history of the prior request by the users and based on the information in the database in storer 25, and the predictor select the predicted data as selected data. In some embodiments, operation 404 further includes selecting which data from the target should be sent as part of a data collection command.

In operation 406, an invariant feature map is generated from the selected target data and stored in a template storer, e.g., template storer 21 (FIG. 1). The invariant feature map generated based on the target is also called a target invariant feature map. The target invariant feature map is generated using a trained NN to extract features of the target for comparison with the collected data. In some embodiments, the target invariant feature map is generated based on additional data associated with the target, such as weather conditions or time of day. In some embodiments, the target invariant feature map is generated to be independent of a type of data or sensor used to gather the collected data.

In operation 408, a data collection command and the template data are transmitted to a vehicle system, e.g., vehicle system VS (FIG. 1). The data collection command instructions the vehicle system to collect data and compare the collected data to the template data based on the target invariant feature map. In some embodiments, the data collection command also includes priority information. In some embodiments, the data collection command also includes weights for a NN algorithm. In some embodiments, the data collection command includes information for overriding protection of private data gathered during the collecting of data. In some embodiments, the data collection command further includes a time period over which the data should be collected. In some embodiments, the data collection command is transmitted to a single vehicle. In some embodiments, the data collection command is transmitted to multiple vehicles. In some embodiments, the data collection command is transmitted wirelessly. In some embodiments, the data collection command is transmitted via a wired connection.

In operation 410, data is collected by sensors in a vehicle. In some embodiments, data is collected by sensors periodically at regular intervals. In some embodiments, data is collected by sensors upon in an event-driven manner, for example, when a shock sensor detect that the vehicle collides with something during driving or parking, data is collected by sensors. In some embodiments, the sensors includes a camera, LiDAR, RADAR, a radio wave sensor or another suitable sensor. In some embodiments, the sensor include camera 5 and other sensors 6 (FIG. 1).

In operation 412, sensor data is stored in a storer, e.g., data storer 8 (FIG. 1). The sensor data stored in the storer is continually updated as more sensor data is sent to the storer. In some embodiments, the storer includes an algorithm for determining when to delete or overwrite sensor data stored in the storer.

In operation 414, the sensor data is analyzed to detect objects captured by the sensor data. In some embodiments, the sensor data is analyzed using object detector 1 (FIG. 1). The detected objects are identified and classified based on type of object, position of the object, proximity of the object to the sensor, or other appropriate classification criteria. In some embodiments, the objects are detected using a trained NN, e.g., NN for object detection 9 such as Single Short Detector (SSD) or Faster R-CNN (FIG. 1). In some embodiments, the object detector 1 detects objects every time the data is received from the sensors. In some embodiments, the object detector 1 detects object only when the judge 15 instructed the object detector 1 to detect objects. In some embodiments, the object detection operation 414 is skipped.

In operation 416, an invariant feature map is generated based on extracted features of the detected objects. The invariant feature map is generated using a NN, e.g., NN for feature extraction 14 (FIG. 1). In some embodiments, the invariant feature map in operation 416 is generated by a NN using a same algorithm as the NN used to generate the target feature map in operation 406. In some embodiments, weights from the operation 406 are provided to the NN used in operation 416 based on the data collection command. In some embodiments, the feature extractor 15 extracts the invariant feature map every time the data is received from the sensors. In some embodiments, the feature extractor 15 extracts the invariant feature map only when the judge 15 instructed the feature extractor 15 to extract the invariant feature map. In some embodiments, the feature extractor 15 extracts the invariant feature map only from a cropped rectangular area, which corresponds to a location of the object that is detected by the object detector 1 in the image data, so that the computational workload and memory bandwidth workload on ECU 4 is reduced. In some embodiments, the feature extractor 15 extracts the invariant feature map from the entire image so that information which is used to search target in the invariant feature map can be enhanced.

In operation 418, the data collection command is received along with template data. In some embodiments, the data collection command is received by a receiver, e.g., receiver 16 (FIG. 1). In some embodiments where the data collection command includes weights, the weights are provided to the NN which performs operation 416 before starting the operation 416 and the operation 416 is executed by using the received weights for NN for feature extraction 14. In some embodiments where the data collection command includes weights, the weights are provided to the NN for similarity estimation 30 which performs operation 420 and the operation 420 is executed by using the received weights for NN for similarity estimation 30. The data collection command and the template data are stored, e.g., in a template storer 17, for comparison with the invariant feature map generated in operation 416.

In operation 420, a similarity between the template data from the data collection command and the invariant feature map from operation 416 is determined. The similarity is determined using a NN, e.g., NN for similarity estimation 30 (FIG. 1).

In operation 422 a determination is made regarding whether the similarity determined in operation 420 exceeds a predetermined threshold. In response to a determination that the similarity exceeds the predetermined threshold, the collected data associated with the invariant feature map is captured from the storer, which stored the sensor data in operation 412. In some embodiments, the sensor data includes a time period before and after the data used to generate the invariant feature map was captured. In some embodiments, the sensor data is associated with location and time data. The sensor data, and any optional additional information, is then transmitted to the server, e.g., server 18 (FIG. 1). In some embodiments, the sensor data is transmitted wirelessly. In some embodiments, the sensor data is transmitted via a wired connection. In some embodiments, the sensor data is post-processed, such as data compression, resize, crop, and etc., before uploaded. In response to a determination that the similarity fails to exceed the predetermined threshold, the sensor data associated with the invariant feature map is discarded or deleted.

In operation 426, the sensor data is received by the server.

In operation 428 the received sensor data is stored, e.g., in data storer 25 (FIG. 1).

One of ordinary skill in the art would recognize that the order of operations of the method 400 is changed in some embodiments. For example, in some embodiments, operation 406 is performed prior to operation 404. In some embodiments, at least one operation of method 400 is omitted. For example, in some embodiments, operation 428 is omitted and the received data is immediately transmitted to the user. In some embodiments, additional operations are included. For example, in some embodiments, an alert or notification is transmitted to the user in response to receiving sensor data corresponding to a target requested by the user. In some embodiments, multiple operations are combined. For example, in some embodiments, operations 420 and 422 are performed in conjunction.

Figure 5:
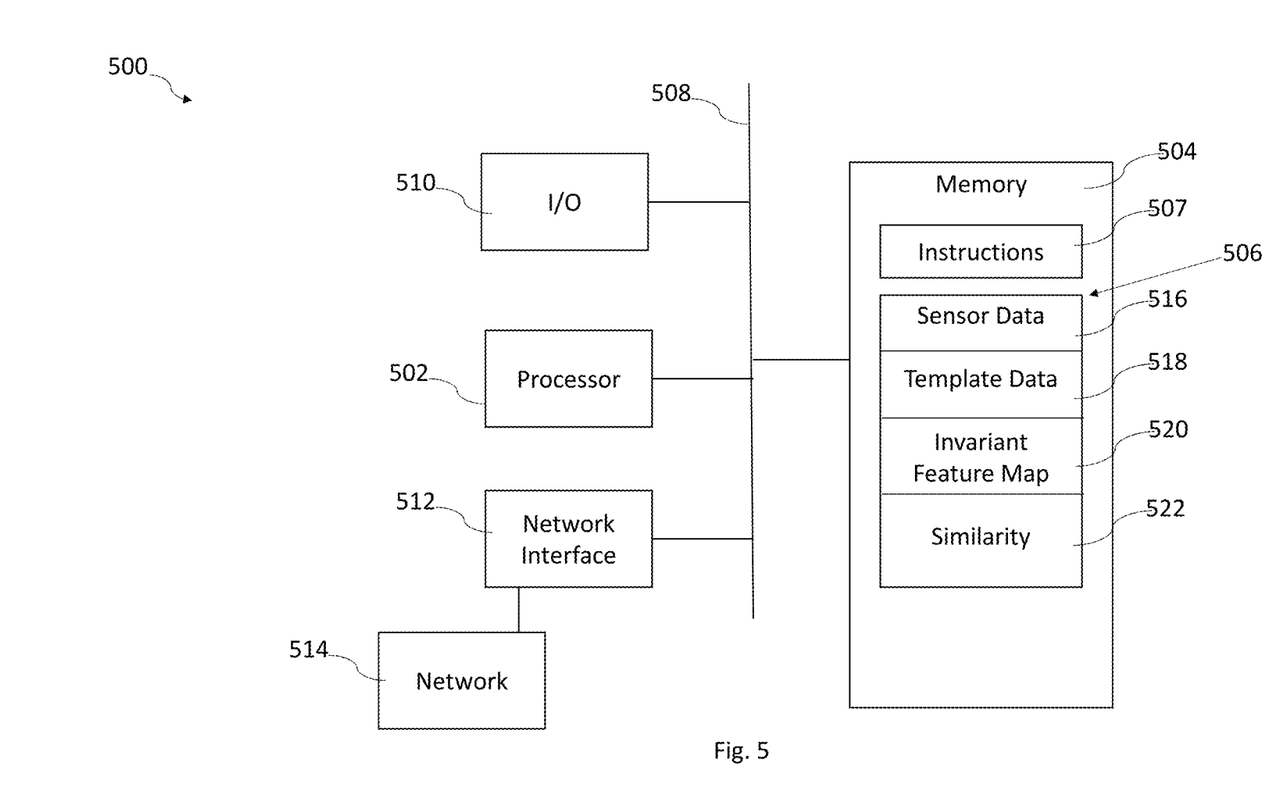
FIG. 5 is a block diagram of a system for implementing a vehicle data collection system in accordance with some embodiments.

FIG. 5 is a block diagram of a system for implementing a vehicle data collection system in accordance with some embodiments. System 500 includes a hardware processor 502 and a non-transitory, computer readable storage medium 504 encoded with, i.e., storing, the computer program code 506, i.e., a set of executable instructions. Computer readable storage medium 504 is also encoded with instructions 507 for interfacing with external devices, such as a mobile device of a user. The processor 502 is electrically coupled to the computer readable storage medium 504 via a bus 508. The processor 502 is also electrically coupled to an I/O interface 510 by bus 508. A network interface 512 is also electrically connected to the processor 502 via bus 508. Network interface 512 is connected to a network 514, so that processor 502 and computer readable storage medium 504 are capable of connecting to external elements via network 514. The processor 502 is configured to execute the computer program code 506 encoded in the computer readable storage medium 504 in order to cause system 500 to be usable for performing a portion or all of the operations as described in system 100 (FIG. 1), method 200 (FIG. 2), method 300 (FIG. 3) or method 400 (FIG. 4).

In some embodiments, the processor 502 is a central processing unit (CPU), a multi-processor, a distributed processing system, a graphics processing unit (GPU), Tensor Processing Unit (TPU), an application specific integrated circuit (ASIC), and/or a suitable processing unit.

In some embodiments, the computer readable storage medium 504 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the storage medium 504 stores the computer program code 506 configured to cause system 500 to perform method 300 or method 400. In some embodiments, the storage medium 504 also stores information needed for performing the operations of system 100 (FIG. 1), method 200 (FIG. 2), method 300 (FIG. 3) or method 400 (FIG. 4) as well as information generated during performing the operations of system 100 (FIG. 1), method 200 (FIG. 2), method 300 (FIG. 3) or method 400 (FIG. 4), such as a sensor data parameter 516, a template data parameter 518, attribute parameters 900, an invariant feature map parameter 520, a similarity parameter 522, and/or a set of executable instructions to perform the operations of system 100 (FIG. 1), method 200 (FIG. 2), method 300 (FIG. 3) or method 400 (FIG. 4).

In some embodiments, the storage medium 504 stores instructions 507 for interfacing with external devices. The instructions 507 enable processor 502 to generate instructions readable by the external devices to effectively implement the operations of system 100 (FIG. 1), method 200 (FIG. 2), method 300 (FIG. 3) or method 400 (FIG. 4).

System 500 includes I/O interface 510. I/O interface 510 is coupled to external circuitry. In some embodiments, I/O interface 510 includes a keyboard, keypad, mouse, trackball, trackpad, and/or cursor direction keys for communicating information and commands to processor 502.

System 500 also includes network interface 512 coupled to the processor 502. Network interface 512 allows system 500 to communicate with network 514, to which one or more other computer systems are connected. Network interface 512 includes wireless network interfaces such as BLUETOOTH, WIFI, WIMAX, GPRS, or WCDMA; or wired network interface such as ETHERNET, USB, or IEEE-1394. In some embodiments, the operations of system 100 (FIG. 1), method 200 (FIG. 2), method 300 (FIG. 3) or method 400 (FIG. 4) are implemented in two or more systems 500, and information is exchanged between different systems 500 via network 514.

An aspect of this description relates to a vehicle data collection system. The vehicle data collection system includes a vehicle-mounted sensor. The vehicle data collection system further includes a non-transitory computer readable medium configured to store instructions. The vehicle data collection system includes a processor connected to the non-transitory computer readable medium. The processor is configured to execute the instructions for generating an invariant feature map, using a first neural network. The processor is further configured to execute the instructions for comparing the invariant feature map to template data to determine a similarity between the invariant feature map and the template data, wherein the template data is received from a server. The processor is further configured to execute the instructions for determining whether the determined similarity is exceeds a predetermined threshold. The processor is further configured to execute the instructions for instructing a transmitter to send the sensor data to the server in response to a determination that the determined similarity exceeds the predetermined threshold. In some embodiments, the processor is further configured to execute the instructions for detecting an object in sensor data captured by the vehicle-mounted sensor; and generate the invariant feature map based on the detected object. In some embodiments, the vehicle-mounted sensor comprises at least one of a camera, a light detection and ranging (LiDAR) sensor, or a radio detecting and ranging (RADAR) sensor. In some embodiments, the template data comprises a target invariant feature map generated based on a target. In some embodiments, the processor is further configured to execute the instructions for removing private information from the sensor data prior to sending the sensor data to the server. In some embodiments, the template data includes weights for a neural network, and the processor is configured to execute the instructions for generating the invariant feature map using the first neural network using the weights. In some embodiments, the template data includes weights for a neural network, and the processor is further configured to execute the instructions for determining the similarity using the second neural network using the weights.

An aspect of this description relates to a vehicle data collection system. The vehicle data collection system includes a graphical user interface (GUI) configured to receive target information from a user. The vehicle data collection system further includes a non-transitory computer readable medium configured to store instructions. The vehicle data collection system further includes a processor connected to the non-transitory computer readable medium. The processor is configured to execute the instructions for receiving target information from the GUI. The processor is further configured to execute the instructions for generating a target invariant feature map, using a first neural network, based on the target information. The processor is further configured to execute the instructions for generating a data collection command based on the target invariant feature map. The processor is further configured to execute the instructions for instructing a transmitter to send the data collection command to at least one vehicle. The processor is further configured to execute the instructions for receiving sensor data from the at least one vehicle in response to the data collection command. The processor is further configured to execute the instructions for reporting the sensor data to the user. In some embodiments, the target information comprises an image. In some embodiments, the processor is configured to execute the instructions for instructing the transmitter to send the data collection command to a plurality of vehicles. In some embodiments, the processor is configured to execute the instructions for generating the data collection command including a priority of a request for data from the vehicle. In some embodiments, the processor is configured to execute the instructions for generating the data collection command including instructions to prevent the vehicle from removing private information from the sensor data based on an identify of the user. In some embodiments, the processor is configured to execute the instructions for reporting the sensor data to the user along with at least one of time or location information associated with the sensor data. In some embodiments, the processor is configured to execute the instructions for reporting the sensor data to the user by generating an alert to a mobile device operated by the user.

An aspect of this description relates to a method. The method includes collecting sensor data using at least one vehicle-mounted sensor. The method further includes generating an invariant feature map, using a first neural network. The method further includes comparing the invariant feature map to template data to determine a similarity between the invariant feature map and the template data, wherein the template data is received from a server. The method further includes determining whether the determined similarity is exceeds a predetermined threshold. The method further includes transmitting the sensor data to the server in response to a determination that the determined similarity exceeds the predetermined threshold. In some embodiments, the method further includes detecting an object in the sensor data, wherein generating the invariant feature map is based on the detected object. In some embodiments, the vehicle-mounted sensor comprises at least one of a camera, a light detection and ranging (LiDAR) sensor, or a radio detecting and ranging (RADAR) sensor. In some embodiments, the template data comprises a target invariant feature map generated based on a target. In some embodiments, the method further includes removing private information from the sensor data prior to transmitting the sensor data to the server. In some embodiments, the template data comprises weights for a neural network, and generating the invariant feature map comprises using the weights in the first neural network.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A vehicle data collection system comprising:
a vehicle-mounted sensor;
a non-transitory computer readable medium configured to store instructions; and
a processor connected to the non-transitory computer readable medium, wherein the processor is configured to execute the instructions for:
generating an invariant feature map from sensor data, using a first neural network;
comparing the invariant feature map to template data to determine a similarity between the invariant feature map and the template data, wherein the template data is received from a server, the template data comprises weights for a neural network, and the weights are optimized to suppress information with a high sensitivity to hardware of the vehicle data collection system;
determining whether the determined similarity exceeds a predetermined threshold; and
instructing a transmitter to send the sensor data to the server in response to a determination that the determined similarity exceeds the predetermined threshold.

2. The vehicle data collection system of claim 1, wherein the processor is further configured to execute the instructions for detecting an object in sensor data captured by the vehicle-mounted sensor; and generate the invariant feature map based on the detected object.

3. The vehicle data collection system of claim 1, wherein the vehicle-mounted sensor comprises at least one of a camera, a light detection and ranging (LiDAR) sensor, or a radio detecting and ranging (RADAR) sensor.

4. The vehicle data collection system of claim 1, wherein the template data comprises a target invariant feature map generated based on a target.

5. The vehicle data collection system of claim 1, wherein the processor is further configured to execute the instructions for removing private information from the sensor data prior to sending the sensor data to the server.

6. The vehicle data collection system of claim 1, wherein the processor is configured to execute the instructions for generating the invariant feature map using the first neural network using the weights.

7. The vehicle data collection system of claim 1, wherein the processor is further configured to execute the instructions for determining the similarity using the second neural network using the weights.

8. A vehicle data collection system comprising:
a graphical user interface (GUI) configured to receive target information from a user;
a non-transitory computer readable medium configured to store instructions; and
a processor connected to the non-transitory computer readable medium, wherein the processor is configured to execute the instructions for:
receiving target information from the GUI;
generating a target invariant feature map, using a first neural network, based on the target information;
generating a data collection command based on the target invariant feature map, wherein the data collection command includes template data, the template data comprises weights for a neural network, and the weights are optimized to suppress information with a high sensitivity to hardware of at least one vehicle;
instructing a transmitter to send the data collection command to the at least one vehicle;
receiving sensor data from the at least one vehicle in response to the data collection command; and
reporting the sensor data to the user.

9. The vehicle data collection system of claim 8, wherein the target information comprises an image.

10. The vehicle data collection system of claim 8, wherein the processor is configured to execute the instructions for instructing the transmitter to send the data collection command to a plurality of vehicles.

11. The vehicle data collection system of claim 8, wherein the processor is configured to execute the instructions for generating the data collection command including a priority of a request for data from the vehicle.

12. The vehicle data collection system of claim 8, wherein the processor is configured to execute the instructions for generating the data collection command including instructions to prevent the vehicle from removing private information from the sensor data based on an identify of the user.

13. The vehicle data collection system of claim 8, wherein the processor is configured to execute the instructions for reporting the sensor data to the user along with at least one of time or location information associated with the sensor data.

14. The vehicle data collection system of claim 8, wherein the processor is configured to execute the instructions for reporting the sensor data to the user by generating an alert to a mobile device operated by the user.

15. A method comprising:
collecting sensor data using at least one vehicle-mounted sensor;
generating an invariant feature map, using a first neural network;
comparing the invariant feature map to template data to determine a similarity between the invariant feature map and the template data, wherein the template data is received from a server, the template data comprises weights for a neural network, and the weights are optimized to suppress information with a high sensitivity to hardware of a vehicle;
determining whether the determined similarity exceeds a predetermined threshold; and
transmitting the sensor data to the server in response to a determination that the determined similarity exceeds the predetermined threshold.

16. The method of claim 15, further comprising detecting an object in the sensor data, wherein generating the invariant feature map comprises generating the invariant feature map based on the detected object.

17. The method of claim 15, wherein the vehicle-mounted sensor comprises at least one of a camera, a light detection and ranging (LiDAR) sensor, or a radio detecting and ranging (RADAR) sensor.

18. The method of claim 15, wherein the template data comprises a target invariant feature map generated based on a target.

19. The method of claim 15, further comprising removing private information from the sensor data prior to transmitting the sensor data to the server.

20. The method of claim 15, wherein generating the invariant feature map comprises using the weights in the first neural network.

* * * * *